United States Patent
Pratley et al.

(10) Patent No.: US 10,415,647 B2
(45) Date of Patent: Sep. 17, 2019

(54) ELASTOMER SERIES COUPLING DAMPER FOR SUPERCHARGER

(71) Applicant: Eaton Corporation, Cleveland, OH (US)

(72) Inventors: Mark Harold Pratley, Marshall, MI (US); William Bruce Witherspoon, Lansing, MI (US); Michael Coates, Marshall, MI (US)

(73) Assignee: Eaton Corporation, Cleveland, OH (US)

( * ) Notice: Subject to any disclaimer, the term of this patent is extended or adjusted under 35 U.S.C. 154(b) by 306 days.

(21) Appl. No.: 15/239,442

(22) Filed: Aug. 17, 2016

(65) Prior Publication Data

US 2016/0356318 A1   Dec. 8, 2016

Related U.S. Application Data

(63) Continuation of application No. PCT/US2015/016287, filed on Feb. 18, 2015.

(Continued)

(51) Int. Cl.
*F16D 3/78* (2006.01)
*F16D 3/70* (2006.01)
(Continued)

(52) U.S. Cl.
CPC ............ *F16D 3/70* (2013.01); *F02B 33/38* (2013.01); *F02B 39/12* (2013.01); *F02B 39/16* (2013.01);
(Continued)

(58) Field of Classification Search
CPC .. F16D 3/70; F16D 47/02; F04C 18/26; F04C 29/005; F04C 23/006; F02B 39/12; F02B 33/38; F02B 39/16
(Continued)

(56) References Cited

U.S. PATENT DOCUMENTS

| 1,626,195 A | * | 4/1927 | Hiller | ............ F16D 3/78 464/95 |
| 3,250,089 A | * | 5/1966 | Bruyere | ............ F16D 1/093 464/94 X |

(Continued)

FOREIGN PATENT DOCUMENTS

| CH | 382502 | * 11/1964 | ............ 464/95 |
| JP | 2010203469 A | 9/2010 | |

OTHER PUBLICATIONS

International Search Report and Written Opinion for International Application No. PCT/US2015/016287 dated May 29, 2015, 11 pages.

*Primary Examiner* — Greg Binda
(74) *Attorney, Agent, or Firm* — RMCK Law Group PLC

(57) ABSTRACT

A coupling assembly arranged between an input shaft and a rotor shaft of a supercharger includes a first hub, a second hub, a first side coupling assembly, a second side coupling assembly, a central hub and a plurality of coupler pins. The first hub can be mounted with the input shaft. The second hub can be mounted with the rotor shaft. The first side coupling assembly can have a first side coupling body and a first side elastomeric insert. The second side coupling assembly can have a second side coupling body and a second side elastomeric insert. The central hub can define central hub bores therein. The plurality of coupler pins can be received in the central hub bores. The first and second side elastomeric inserts provide dampening between (i) the first side coupling body and the central hub and (ii) the second side coupling body and the central hub.

17 Claims, 12 Drawing Sheets

Related U.S. Application Data

(60) Provisional application No. 61/941,114, filed on Feb. 18, 2014, provisional application No. 62/045,529, filed on Sep. 3, 2014, provisional application No. 62/050,350, filed on Sep. 15, 2014.

(51) Int. Cl.
<table>
<tr><td><i>F02B 33/38</i></td><td>(2006.01)</td></tr>
<tr><td><i>F02B 39/16</i></td><td>(2006.01)</td></tr>
<tr><td><i>F02B 39/12</i></td><td>(2006.01)</td></tr>
<tr><td><i>F16D 47/02</i></td><td>(2006.01)</td></tr>
<tr><td><i>F04C 23/00</i></td><td>(2006.01)</td></tr>
<tr><td><i>F04C 29/00</i></td><td>(2006.01)</td></tr>
<tr><td><i>F04C 18/12</i></td><td>(2006.01)</td></tr>
</table>

(52) U.S. Cl.
CPC .......... *F04C 18/126* (2013.01); *F04C 23/006* (2013.01); *F04C 29/005* (2013.01); *F16D 3/78* (2013.01); *F16D 47/02* (2013.01)

(58) Field of Classification Search
USPC ...................................................... 464/93–96
See application file for complete search history.

(56) References Cited

U.S. PATENT DOCUMENTS

| | | | |
|---|---|---|---|
| 6,325,722 B1 | 12/2001 | Ciotola | |
| 9,803,697 B2 * | 10/2017 | Witherspoon | ........... F02B 39/04 |
| 2007/0193015 A1 | 8/2007 | Gilbert | |
| 2008/0149452 A1 | 6/2008 | Pratley et al. | |
| 2017/0002872 A1 * | 1/2017 | Pratley | .................... F02B 33/38 |

\* cited by examiner

ELASTOMER SERIES COUPLING DAMPER FOR SUPERCHARGER

CROSS-REFERENCE TO RELATED APPLICATIONS

This application is a continuation of International Application No. PCT/US2015/016287 filed on Feb. 18, 2015, which claims the benefit of U.S. Provisional Patent Application Nos. 61/941,114 filed on Feb. 18, 2014, 62/045,529 filed on Sep. 3, 2014 and 62/050,350 filed on Sep. 15, 2014. The disclosures of all of the above applications are incorporated herein by reference.

FIELD

The present disclosure relates generally to superchargers and more particularly to a coupling between an input shaft and a rotor shaft on a supercharger.

BACKGROUND

Rotary blowers of the type to which the present disclosure relates are referred to as "superchargers" because they effectively super charge the intake of the engine. One supercharger configuration is generally referred to as a Roots-type blower that transfers volumes of air from an inlet port to an outlet port. A Roots-type blower includes a pair of rotors which must be timed in relationship to each other, and therefore, are driven by meshed timing gears which are potentially subject to conditions such as gear rattle and bounce. Typically, a pulley and belt arrangement for a Roots blower supercharger is sized such that, at any given engine speed, the amount of air being transferred into the intake manifold is greater than the instantaneous displacement of the engine, thus increasing the air pressure within the intake manifold and increasing the power density of the engine.

In some examples, superchargers such as the Roots-type blower can create unwanted noise. For example, Roots-type blower noise may be classified as either of two types. The first is solid borne noise caused by rotation of timing gears and rotor shaft bearings subjected to fluctuating loads (the firing pulses of the engine), and the second is fluid borne noise caused by fluid flow characteristics, such as rapid changes in fluid (air) velocity. The present disclosure is primarily directed toward the solid borne noise. More particularly the present disclosure can minimize the "bounce" of the timing gears during times of relatively low speed operation, when the blower rotors are not "under load". In this regard, it is important to isolate the fluctuating input to the supercharger from the timing gears. In other examples it is desirable to account for misalignment and/or runout between the input shaft and rotor shaft. In some operating conditions, decoupling the supercharger inertia from the belt system can help reduce unwanted noise generated in the belt system.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A coupling assembly arranged between an input shaft and a rotor shaft of a supercharger can include a first hub, a second hub, a first side coupling assembly, a second side coupling assembly, a central hub and a plurality of coupler pins. The first hub can be mounted for concurrent rotation with the input shaft. The second hub can be mounted for concurrent rotation with the rotor shaft. The first side coupling assembly can have a first side coupling body and a first side elastomeric insert. The first side coupling assembly can define a first plurality of openings therein. The second side coupling assembly can have a second side coupling body and a second side elastomeric insert. The second side coupling assembly can define a second plurality of openings therein. The central hub can be disposed intermediate the first and second side coupling assemblies. The central hub can define central hub bores therein. The plurality of coupler pins can be received in the central hub bores and extend on one end into the first plurality of openings and on a second end into the second plurality of openings. The first and second side elastomeric inserts provide dampening between (i) the first side coupling body and the central hub and (ii) the second side coupling body and the central hub.

According to additional features, the coupling assembly can further include a first hub and a second hub. The first hub can be configured to couple between the input shaft and the first side coupling assembly. The first hub can have a first plurality of hub pins extending therefrom. The second hub can be configured to couple between the rotor shaft and the second side coupling assembly. The second hub can have a second plurality of hub pins extending therefrom. The central hub can further define arcuate passages formed therein and configured to at least partially receive the first hub pins and the second hub pins.

According to other features, the first side coupling body can define a plurality of openings having an oval shape. The first side elastomeric insert can define a plurality of apertures having a circular shape. The second side coupling body can define a plurality of openings having an oval shape. The second side elastomeric insert can define a plurality of apertures having a circular shape.

According to additional features the plurality of coupler pins and the first plurality of hub pins are permitted to travel within the boundary of the oval openings in the first side coupling body while the first side elastomeric insert absorbs torsional loads. The plurality of coupler pins and the second plurality of hub pins are permitted to travel within the boundary of the oval openings in the second side coupling body while the second side elastomeric insert absorbs torsional loads. The first and second side elastomeric inserts can be formed on molded rubber.

According to still other features, the first side coupling body and the second side coupling body both include (i) an outboard body portion having a cylindrical outer surface and (ii) an inboard body portion having a plurality of radially extending lobes. The first side coupling body and the second side coupling body both include diametrically opposed inner and outer cylindrical walls in the outboard body portion that define a pocket. The first and second side elastomeric inserts can be received by the respective pockets. The first and second side coupling bodies can be formed of glass-filled molded nylon. The first side elastomeric insert can provide parallel damping for the first side coupling assembly as it absorbs rotational energy from the coupler pins. The second side elastomeric insert can provide parallel damping for the second side coupling assembly as it absorbs rotational energy from the coupler pins. The first side coupling assembly and the second side coupling assembly cooperate to provide series dampening along the coupler pins along opposite sides of the central hub.

A coupling assembly arranged between an input shaft and a rotor shaft of a supercharger and constructed in accordance to another example of the present disclosure can include a first hub, a first plurality of coupling pins, a second hub, a second plurality of coupling pins and a central hub. The first hub can include a first plurality of openings therein. The first hub can be mounted for concurrent rotation with the input shaft. The first plurality of coupling pins can extend from the first plurality of openings. The second hub can have a second plurality of openings therein. The second hub can be mounted for concurrent rotation with the rotor shaft. The second plurality of coupling pins can extend from the second plurality of openings. The central hub can be disposed intermediate the first and second hubs. The central hub can have an elastomeric body that defines a series of passages therethrough. The first plurality of pins and the second plurality of pins can be alternately received by the series of passages of the elastomeric body.

According to other features, the passages can provide incremental dampening against the first and second plurality of pins. The series of passages can each define a first end having a circular cross-section and an opposite end defining an oblong cross-section. In another configuration the series of passages can each define a first end having an oblong cross-section and an opposite end defining an oblong cross-section. The passages can taper inwardly toward a central waist having a circular cross-section. In one example the oblong cross-sections can have a length of substantially 9.6 mm and a radius of substantially 3.5 mm. The central hub can further comprise an inner band and an outer band. The first and second plurality of coupling pins can provide substantially 10 degrees of travel in a first rotational direction relative to the central hub and substantially 10 degrees of travel in a second rotational direction relative to the central hub, the first and second directions being opposite.

BRIEF DESCRIPTION OF THE DRAWINGS

The present disclosure will become more fully understood from the detailed description and the accompanying drawings, wherein.

DETAILED DESCRIPTION

Figure 1:
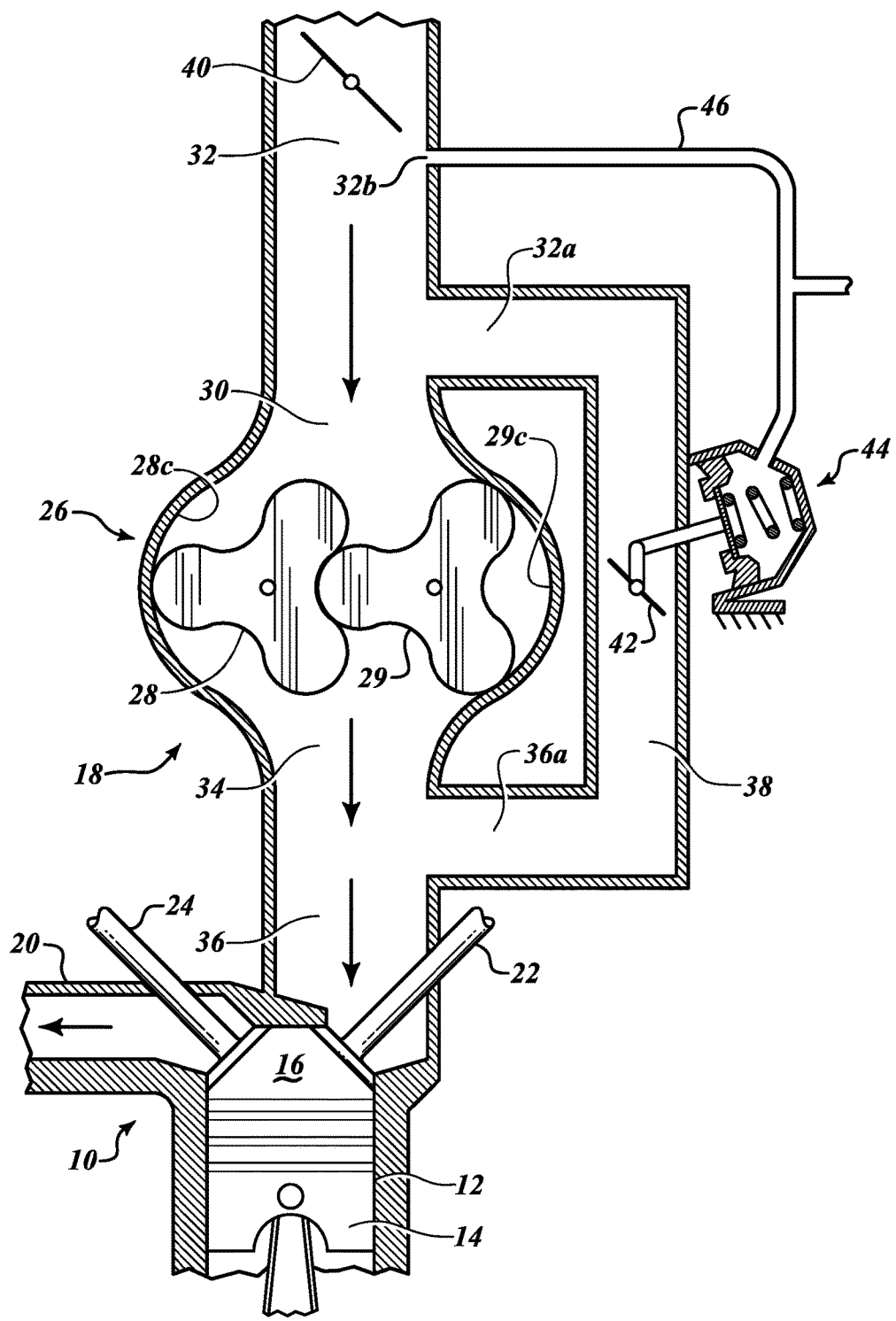
FIG. 1 is a schematic illustration of an intake manifold assembly having a positive displacement blower or supercharger constructed in accordance to one example of the present disclosure.

With initial reference to FIG. 1, a schematic illustration of an exemplary intake manifold assembly, including a Roots blower supercharger and bypass valve arrangement is shown. An engine 10 can include a plurality of cylinders 12, and a reciprocating piston 14 disposed within each cylinder and defining an expandable combustion chamber 16. The engine 10 can include intake and exhaust manifold assemblies 18 and 20, respectively, for directing combustion air to and from the combustion chamber 16, by way of intake and exhaust valves 22 and 24, respectively.

The intake manifold assembly 18 can include a positive displacement rotary blower 26, or supercharger of the Roots type. Further description of the rotary blower 26 may be found in commonly owned U.S. Pat. Nos. 5,078,583 and 5,893,355, which are expressly incorporated herein by reference. The blower 26 includes a pair of rotors 28 and 29, each of which includes a plurality of meshed lobes. The rotors 28 and 29 are disposed in a pair of parallel, transversely overlapping cylindrical chambers 28c and 29c, respectively. The rotors 28 and 29 may be driven mechanically by engine crankshaft torque transmitted thereto in a known manner, such as by a drive belt (not specifically shown). The mechanical drive rotates the blower rotors 28 and 29 at a fixed ratio, relative to crankshaft speed, such that the displacement of the blower 26 is greater than the engine displacement, thereby boosting or supercharging the air flowing to the combustion chambers 16.

The blower 26 can include an inlet port 30 which receives air or air-fuel mixture from an inlet duct or passage 32, and further includes a discharge or outlet port 34, directing the charged air to the intake valves 22 by means of a duct 36. The inlet duct 32 and the discharge duct 36 are interconnected by means of a bypass passage, shown schematically at reference 38. If the engine 10 is of the Otto cycle type, a throttle valve 40 can control air or air-fuel mixture flowing into the intake duct 32 from a source, such as ambient or atmospheric air, in a well know manner. Alternatively, the throttle valve 40 may be disposed downstream of the supercharger 26.

A bypass valve 42 is disposed within the bypass passage 38. The bypass valve 42 can be moved between an open position and a closed position by means of an actuator assembly 44. The actuator assembly 44 can be responsive to fluid pressure in the inlet duct 32 by a vacuum line 46. The actuator assembly 44 is operative to control the supercharging pressure in the discharge duct 36 as a function of engine power demand. When the bypass valve 42 is in the fully open position, air pressure in the duct 36 is relatively low, but when the bypass valve 42 is fully closed, the air pressure in the duct 36 is relatively high. Typically, the actuator assembly 44 controls the position of the bypass valve 42 by means of a suitable linkage. The bypass valve 42 shown and described herein is merely exemplary and other configurations are contemplated. In this regard, a modular (integral) bypass, an electronically operated bypass, or no bypass may be used.

Figure 2:
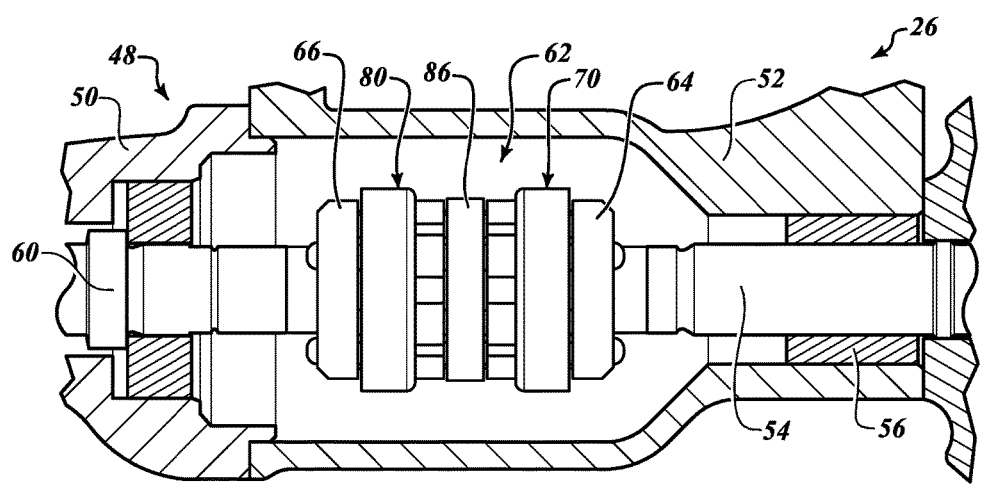
FIG. 2 is an enlarged, fragmentary, axial cross-section of the input section of the supercharger of FIG. 1 and having a coupling assembly used to couple an input shaft and a rotor shaft and constructed in accordance to one example of the present disclosure.
Figure 3:
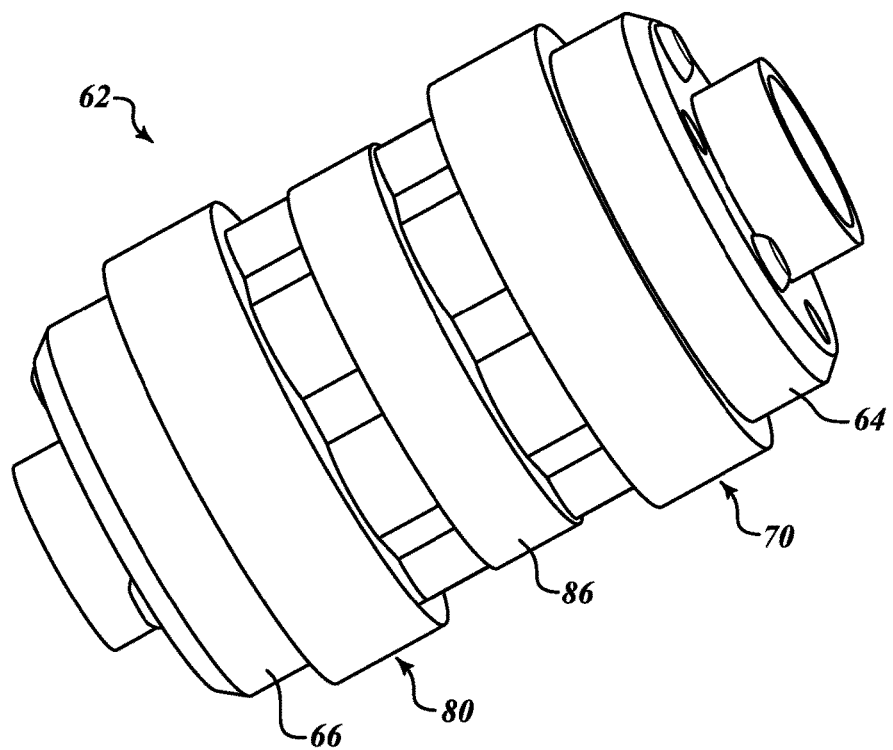
FIG. 3 is front perspective view of the coupling assembly of FIG. 2.

With specific reference now to FIG. 2, an input section 48 of the blower 26 is shown. The input section 48 can include a housing member 50, which forms a forward end of the chambers 28c and 29c. Attached to the housing member 50 is a forward housing 52 within which is disposed an input shaft 54. The input shaft 54 is supported within the forward housing 52 by at least one bearing 56. Rotatably supported by the housing member 50 is a rotor shaft 60, upon which is mounted the blower rotor 28 (see FIG. 1). A coupling assembly 62 couples the input shaft 54 to the rotor shaft 60. In one example, a first hub 64 can couple the input shaft 54 to the coupling assembly 62 on a first end and a second hub 66 can couple the rotor shaft 60 to the coupling assembly 62 on an opposite end. While not specifically shown, a first timing gear may be mounted on a forward end of the rotor shaft. The first timing gear may define teeth that are in meshed engagement with gear teeth of a second timing gear that is mounted on the second rotor shaft. The second rotor shaft would be in driving engagement with the blower rotor 29.

In one configuration, positive torque is transmitted from an internal combustion engine (of the periodic combustion type) to the input shaft 54 by any suitable drive means, such as a belt and pulley drive system (not shown herein). Torque is transmitted from the input shaft 54 to the rotor shaft 60 through the coupling assembly 62. The coupling assembly 62 of the present disclosure provides torsional damping and can further account for misalignment between the input shaft 54 and the rotor shaft 60. When the engine 10 is driving the timing gears and the blower rotors 28 and 29, such is considered to be transmission of positive torque. On the other hand, whenever the momentum of the rotors 28 and 29 overruns the input from the input shaft 54, such is considered to be the transmission of negative torque.

With additional reference now to FIGS. 3-12, the coupling assembly 62 constructed in accordance to one example of the present disclosure will be described in greater detail. The coupling assembly 62 can generally include a first side coupling assembly 70, a second side coupling assembly 80, a central hub 86, and a plurality of coupler pins 88. The first side coupling assembly 70 can include a first side coupling body 90 and a first side elastomeric insert 92. The second side coupling assembly 80 can include a second side coupling body 94 and a second side elastomeric insert 96. In the example shown, the first and second coupling assemblies 70 and 80 are constructed similarly. All of the coupler pins 88 are also constructed similarly.

Figure 4:
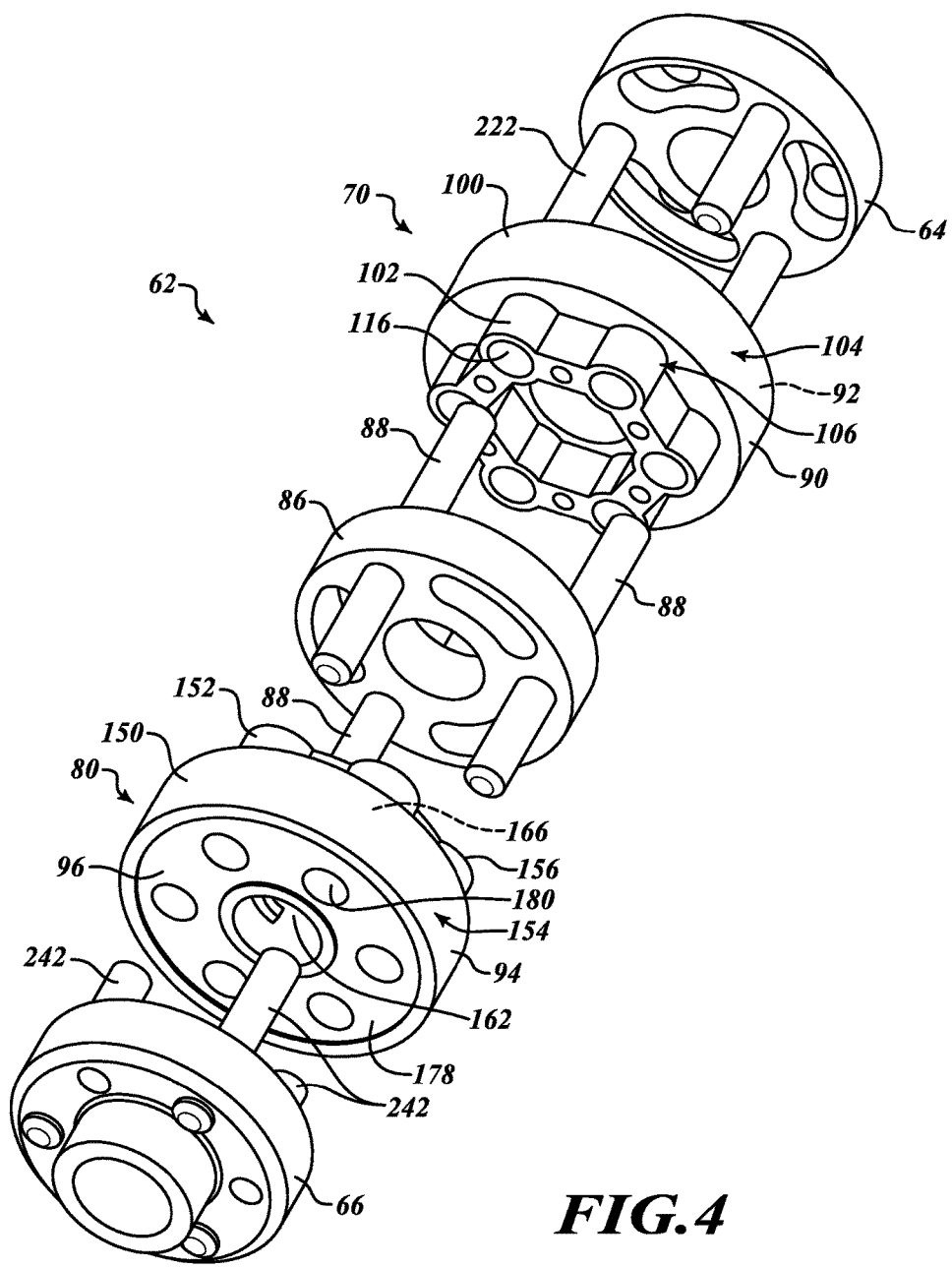
FIG. 4 is an exploded view of the coupling assembly of FIG. 3.
Figure 5:
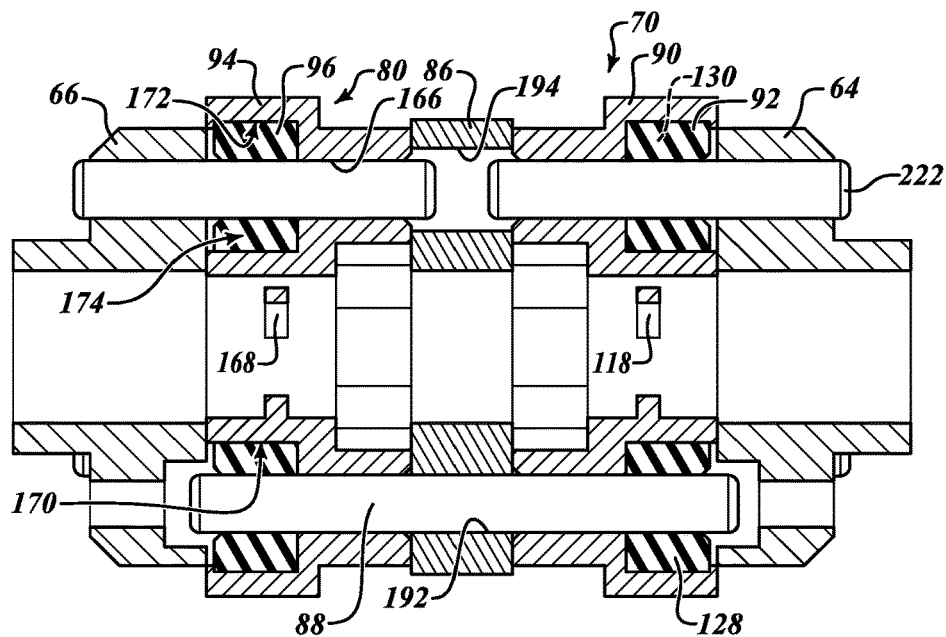
FIG. 5 is a cross-sectional view taken along lines 5-5 of the coupling assembly of FIG. 3.
Figure 6:
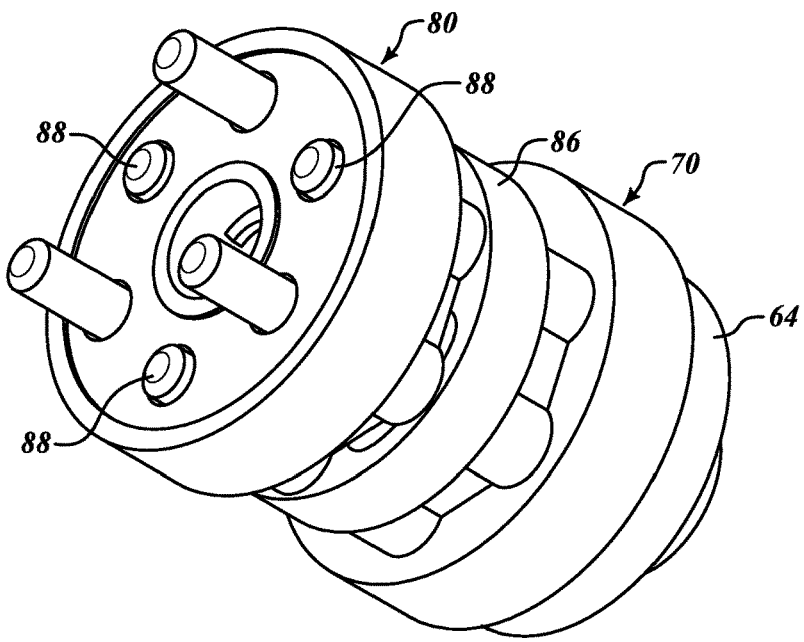
FIG. 6 is perspective view of the coupling assembly of FIG. 3 and shown with a second hub removed.

With particular reference now to FIGS. 4 and 5, the first side coupling assembly 70 will be described. The first side coupling body 90 generally includes an outboard body portion 100 and an inboard body portion 102. In the example shown, the outboard body portion 100 includes a cylindrical outer surface 104 while the inboard body portion 102 includes a plurality of radially extending lobes 106.

Figure 10:
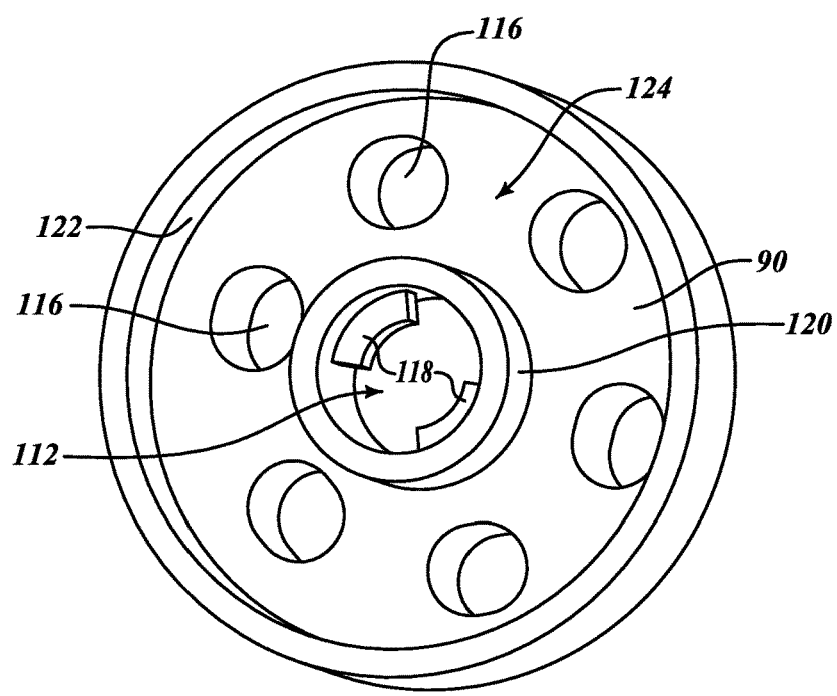
FIG. 10 is a perspective view of a first side coupling body.
Figure 19:
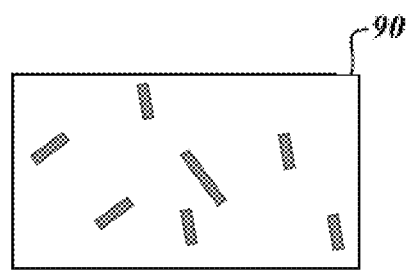
FIG. 19 illustrates a detail cross-sectional view of a first side coupling body formed of glass-filled molded nylon according to one example.

With specific reference to FIG. 10, the first side coupling body 90 further defines a central bore 112 and a plurality of openings 116. The plurality of openings 116 generally define an oval profile to accommodate radial translation of the respective coupler pins 88 extending from the central hub 86 and hub pins 222 (FIGS. 11 and 12) extending from the first hub 64. A pair of diametrically opposing tabs 118 can extend into the central bore 112. In one example, the tabs 118 can provide a gripping surface for a tool when removing components of the coupling assembly 62. The first side coupling body 90 includes diametrically opposed inner and outer cylindrical walls 120 and 122 that define a pocket 124 therebetween. The pocket 124 is configured to receive the first side elastomeric insert 92 (again the first side elastomeric insert 92 is constructed similarly to the second side elastomeric insert 96 shown in FIG. 4). The first side coupling body 90 can be formed of any suitable lightweight durable material such as, but not limited to, PEEK or glass-filled molded nylon as shown in FIG. 19.

The first side elastomeric insert 92 includes a first side elastomeric body 128 having a series of openings 130 (FIG. 5) therein. The series of openings 130 align with the plurality of openings 116 in the first side coupling body 90. The series of openings 130 are cylindrical in shape. In this regard, the respective coupler pins 88 and hub pins 222 are permitted to travel within the boundary of the oval openings 116 while the first side elastomeric insert 92 absorbs torsional loads. In one example the first elastomeric insert 92 can be formed of molded rubber such as hydrogenated nitrile butadiene rubber (HNBR).

The second side coupling assembly 80 can be constructed similarly to the first side coupling assembly 70. In one configuration the first and second side coupling assemblies 70 and 80 can be identical. The second side coupling body 94 generally includes an outboard body portion 150 and an inboard body portion 152. In the example shown, the outboard body portion 150 includes a cylindrical outer surface 154 while the inboard body portion 152 includes a plurality of radially extending lobes 156.

The second side coupling body 94 further defines a central bore 162 and a plurality of openings 166 (FIGS. 4 and 5). The plurality of openings 166 generally define an oval profile to accommodate radial translation of the respective coupler pins 88 extending from the central hub 86 and hub pins 242 extending from the second hub 66. A pair of diametrically opposing tabs 168 can extend into the central bore 162. The second side coupling body 94 includes diametrically opposed inner and outer cylindrical walls 170 and 172 (FIG. 5) that define a pocket 174 therebetween. The pocket 174 is configured to receive the second side elastomeric insert 96 (again the first side elastomeric insert 92 is constructed similarly to the second side elastomeric insert 96 shown in FIG. 4). The second side coupling body 94 can be formed of any suitable lightweight durable material such as, but not limited to, PEEK or glass-filled molded nylon. The second side elastomeric insert 96 includes a second side elastomeric body 178 having a series of openings 180 (FIG. 4) therein. The series of openings 180 align with the plurality of openings 166 in the second side coupling body 94. The series of openings 180 are cylindrical in shape. In this regard, the respective coupler pins 88 and hub pins 242 are permitted to travel within the boundary of the oval openings 166 while the second side elastomeric insert 96 absorbs torsional loads. In one example the second side elastomeric insert 96 can be formed of molded rubber such as HNBR.

As will become appreciated from the following discussion, the coupler pins 88 can bear against the surfaces defined by the first and second openings 130 and 180 of the respective first and second elastomeric inserts 92 and 96. The elastomeric material of the first and second elastomeric inserts 92 and 96 can absorb the rotational energy from the coupler pins 88 during operation of the rotary blower 26 to provide dampening. Additionally, the hub pins 222 and 242 are also (alternately with the coupler pins 88) received by the first and second apertures 130 and 180 of the respective first and second elastomeric inserts 92 and 96. The elastomeric material of the first and second elastomeric inserts 92 and 96 can absorb the rotational energy from the hub pins 222 and 242 during operation of the rotary blower 26 to provide dampening.

Figure 7:
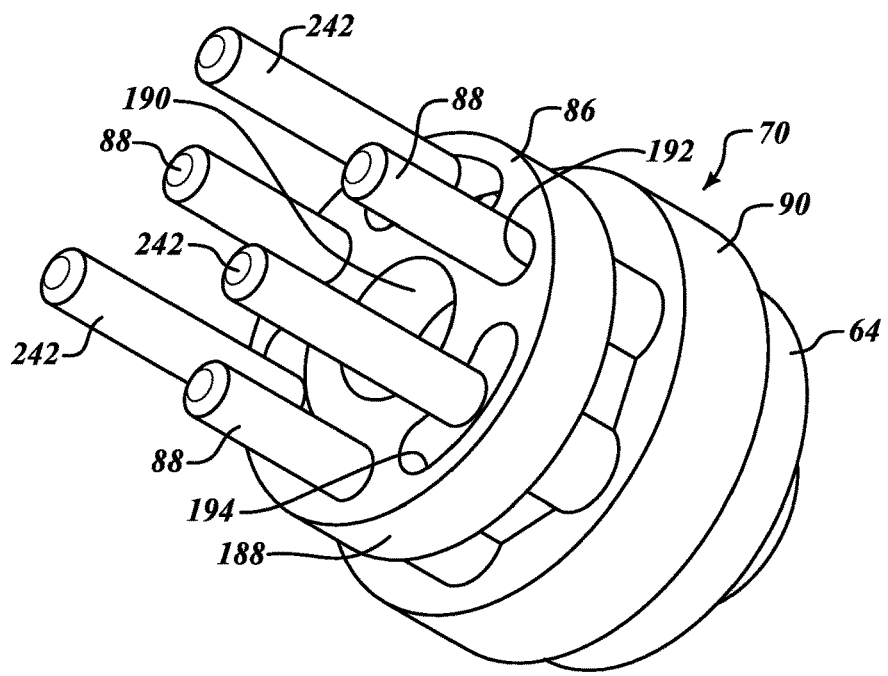
FIG. 7 is a perspective view of the coupling assembly of FIG. 6 and shown with a second side coupling assembly removed.
Figure 8:
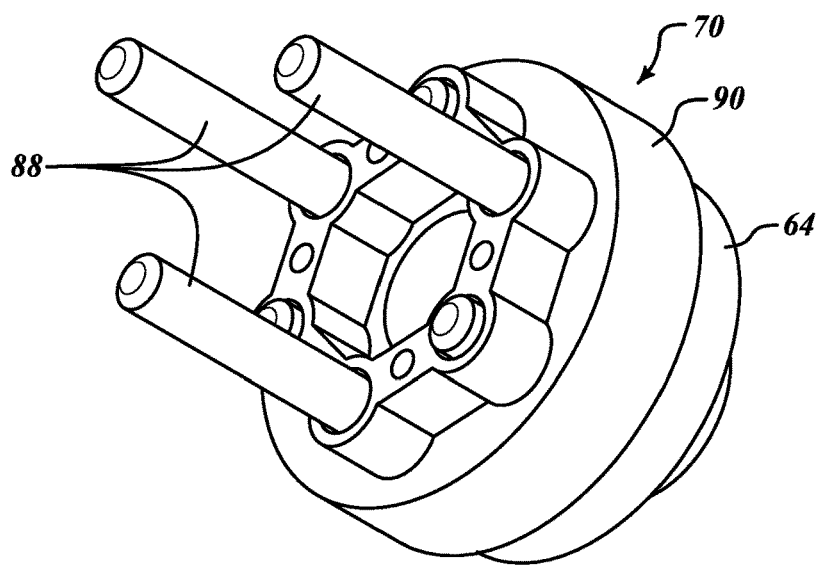
FIG. 8 is a perspective view of the coupling assembly of FIG. 7 and shown with the central hub removed
Figure 9:
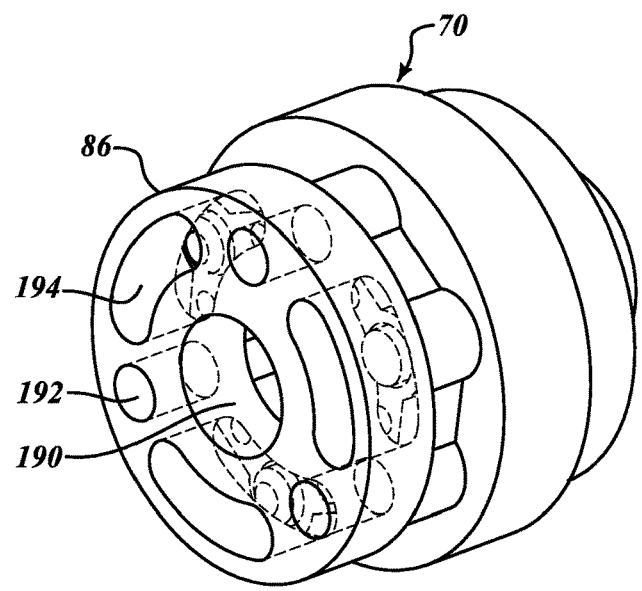
FIG. 9 is a perspective view of the coupling assembly of FIG. 7 and shown with the central hub, coupler pins and second hub pins removed

With particular reference to FIGS. 5 and 7, the central hub 86 includes a central hub body 188 having central bore 190, a series of alternately arranged bores 192 and arcuate passages 194. The central hub 86 can be formed of steel. The bores 192 can be configured to receive the coupler pins 88. The arcuate passages 194 can be configured to accommodate hub pins 222 and 242 associated with the first and second hubs 64 and 66 (see FIG. 2).

Figure 11:
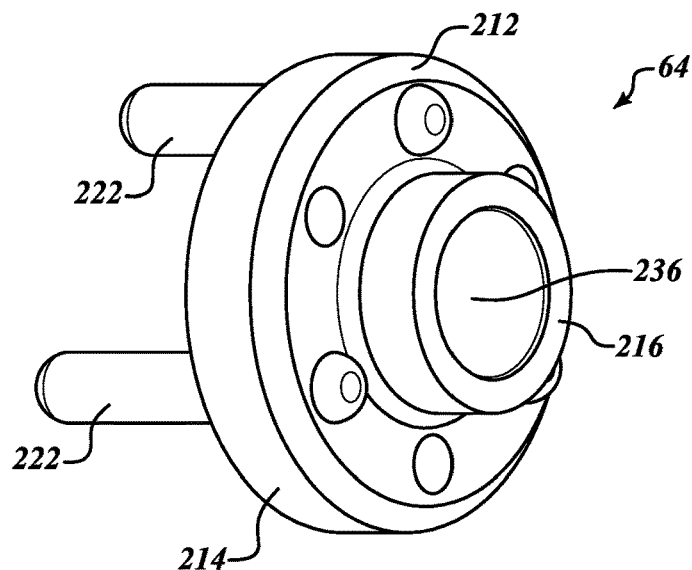
FIG. 11 is a front perspective view of the first hub of FIG. 2.
Figure 12:
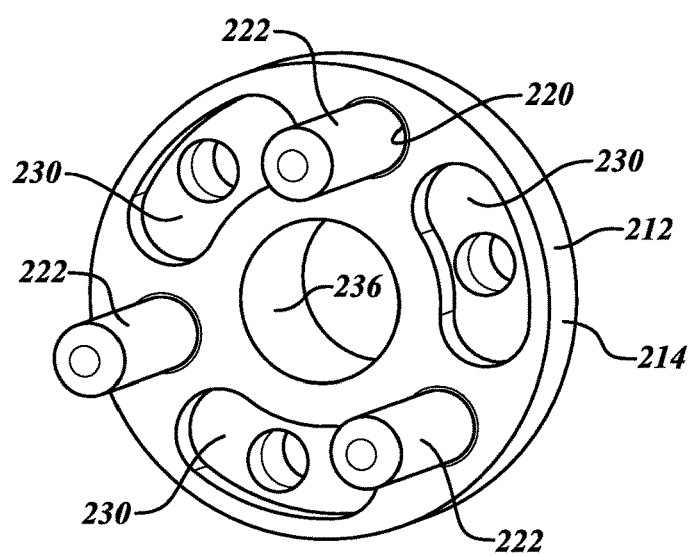
FIG. 12 is a rear perspective view of the first hub of FIG. 11.
Figure 13:
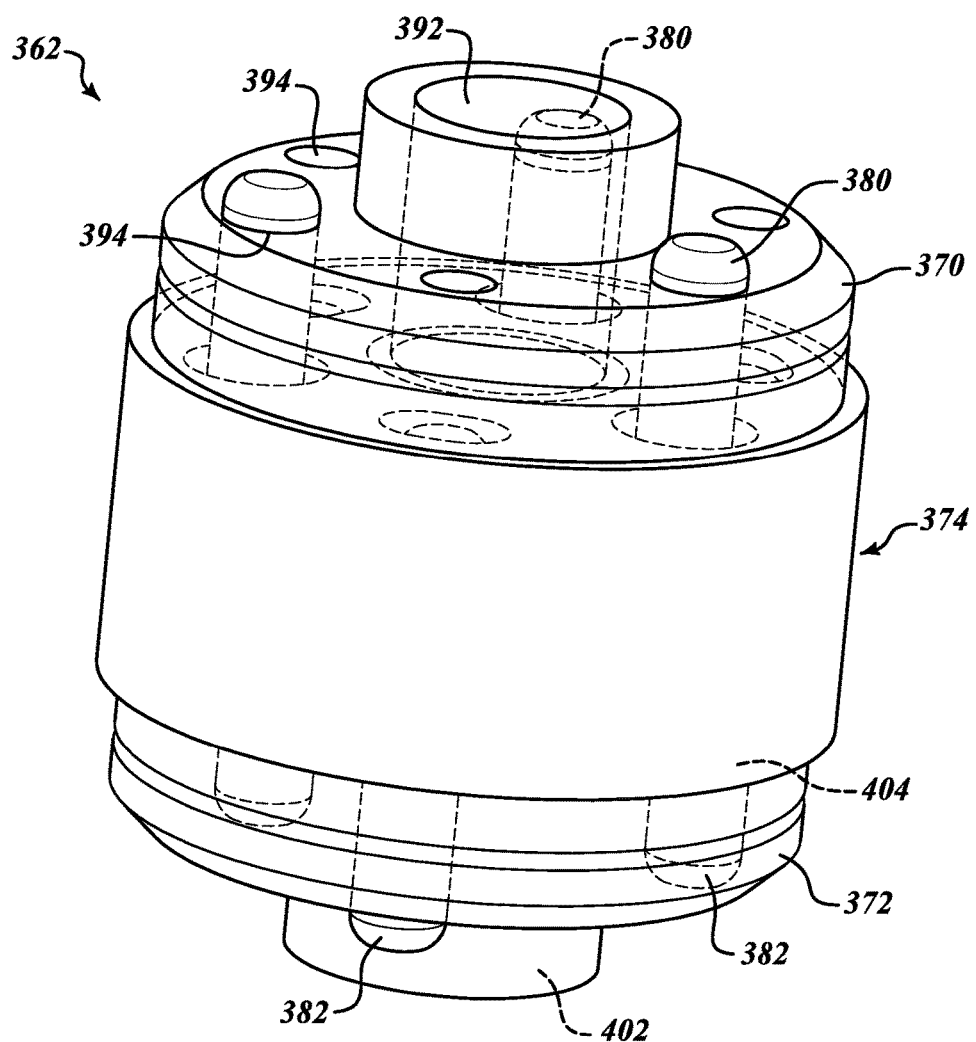
FIG. 13 is a front perspective view of a coupling assembly constructed in accordance to additional features of the present disclosure.
Figure 14:
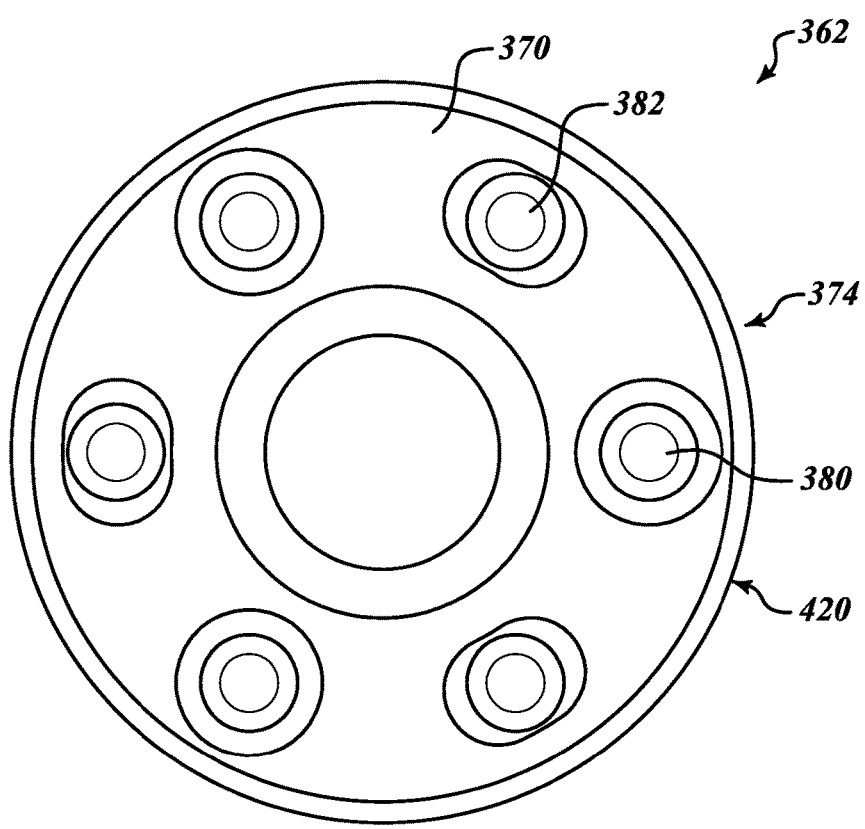
FIG. 14 is an end view of the coupling assembly of FIG. 13.
Figure 15:
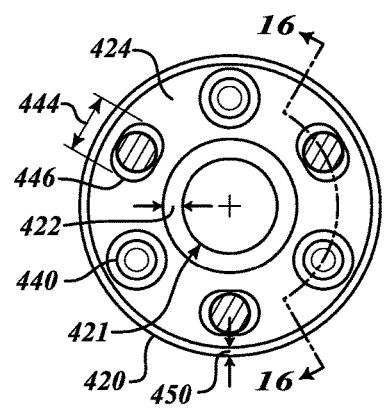
FIG. 15 is an end view of a central hub of the coupling assembly of FIG. 13 and taken along lines 15-15 of FIG. 16.
Figure 16:
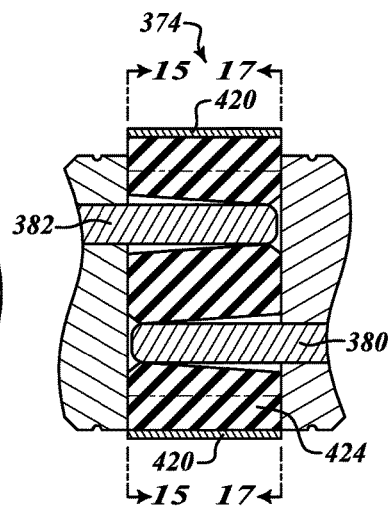
FIG. 16 is a cross-sectional view taken along lines 16-16 of FIG. 15.
Figure 17:
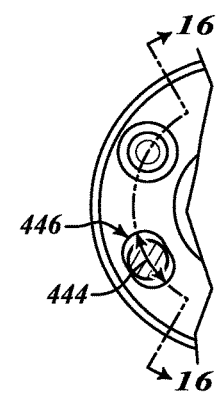
FIG. 17 is a detail end view taken along lines 17-17 of the central hub of FIG. 16.

With reference now to FIGS. 11 and 12, the first hub 64 will be described in greater detail. In general, the first hub 64 is used to couple the input shaft 54 to the coupling assembly 62. The second hub 66 is used to couple the rotor shaft 60 to the coupling assembly 62. The first hub 64 and the second hub 66 are constructed similarly. In this regard, only the first hub 64 is shown in FIGS. 11 and 12 will be described. The first hub 64 can generally include a first hub body 212 including a central hub body 214 and a distal protruding section 216. The central hub body 214 includes a plurality of apertures 220 that receive hub pins 222 therein. A series of counter-recesses 230 are formed in the central hub body 214. The counter-recesses are formed in an arcuate shape. The counter-recesses 230 are arranged to accommodate a terminal end portion of the coupler pins 88 (FIG. 2). The arcuate shape can accommodate relative rotational movement of the coupler pins 88 in the counter-recesses 230. A central bore 236 is formed through the first hub 212. In one example, the input shaft 54 can be press-fit into the central bore 236.

In an assembled position, the hub pins 222 extending from the first hub 64 can extend through the respective openings 116 of the first side coupling body 90, the first openings 130 of the first side elastomeric insert 92 and into the arcuate passages 194 of the central hub 86. Similarly, the hub pins 242 extending from the second hub 66 can extend through the respective openings 166 of the second side coupling body 94, the openings 180 of the second side elastomeric insert 96 and into the arcuate passages 194 of the central hub 86. During operation, the coupling assembly 62 provides torsional dampening between the input shaft 54 to the rotor shaft 60. In this regard, the first elastomeric insert 92 provides parallel damping for the first side hub coupling assembly 70 as it absorbs rotational energy from the coupler pins 88. Similarly, the second elastomeric insert 96 provide parallel damping for the second side hub coupling assembly 80 as it absorbs rotational energy from the coupler pins 88. The first side hub coupling assembly 70 and the second side hub coupling assembly 72 cooperate to provide series damping along the coupler pins 88 on opposite sides of the central hub 86. In this regard, the coupling assembly 62 provides both parallel and series damping to provide misalignment degree of freedom, torsional rate reduction and torsional dampening. In additional examples, the coupling assembly 62 may be provided with only one side coupling assembly instead of two in series.

With additional reference now to FIGS. 13-18B, a coupling assembly 362 constructed in accordance to another example of the present disclosure will be described in greater detail. The coupling assembly 362 can generally include a first hub 370, a second hub 372, a central hub 374, a first plurality of coupler pins 380 and a second plurality of coupler pins 382. In the example shown, the first and second hubs 370 and 372 are constructed similarly. All of the first and second plurality of coupler pins 380 and 382 are also constructed similarly.

The first hub 370 includes a first hub body 390 that defines a central bore 392 and a plurality of openings 394. As will become appreciated, every other opening 394 is configured to receive a coupler pin 380. The input shaft 54 (FIG. 2) can be configured to be received by the central bore 392. The second hub 372 includes a hub body 400 that defines a central bore 402 and a plurality of openings 404. The rotor shaft 60 (FIG. 2) can be configured to be received by the central bore 402. As will become appreciated, every other opening 404 is configured to receive a coupler pin 382. In the example provided, the openings 394 that receive a coupler pin 380 on the first hub 370 are axially aligned with openings 404 on the second hub 372 that do not receive coupler pins 382. Similarly, the openings 404 that receive the coupler pins 382 on the second hub 372 are axially aligned with openings 394 on the first hub 370 that do not receive coupler pins 380.

The central hub 374 will now be described. The central hub 374 includes an outer band 420, an inner band 422 and an intermediate elastomeric body 424. The intermediate elastomeric body 424 defines a series of passages 440. The passages 440 have an oblong cross-section on one end (FIG. 17) and a circular cross-section on an opposite end. In this regard, the coupler pins 380 enter the passages 440 at the oblong end and extend toward the circular end. Similarly, the coupler pins 382 enter the passages 440 (from the opposite end of the central hub 374) at the oblong end and extend toward the circular end.

In one example, the profile of the passages 440 provides incremental dampening as the pins 380 and 382 rotate relative to the central hub 374. In one example, the pins 380 and 382 can provide substantially plus/minus 10 degrees of travel to dampen engine torsional loads. For example between 8 and 12 degrees of travel may be provided in either rotational direction. Other configurations are contemplated. Various non-limiting dimensions will now be described. The circular end of the passages 440 can have a diameter of 4.4 mm. The oblong end of the passages 430 can have a length 444 and a radius 446. The length 444 can be 9.6 mm. The radius 446 can be 3.5 mm. The outer band 420 can have a thickness 450. The inner band 422 can have a thickness 452. The thicknesses 450 and 452 can both be 1.5 mm. The pins 380 and 382 can have diameters of 7 mm. In other examples, the profile of the passages 440 can be circular from end to end.

Figure 18A:
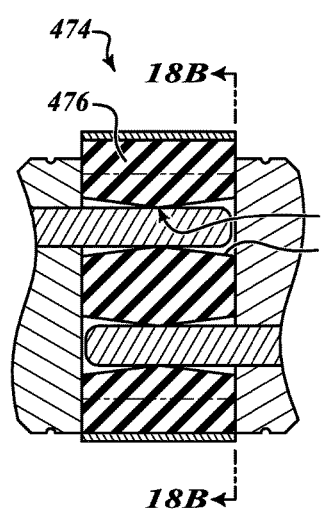
FIG. 18A is a cross-sectional view taken along lines 18A-18A of a central hub constructed in accordance to additional features of the present disclosure and shown in FIG. 18B.
Figure 18B:
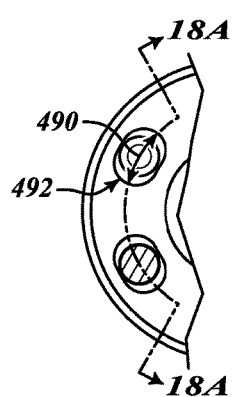
FIG. 18B is a sectional view taken along lines 18B-18B of the central hub of FIG. 18A.

With reference to FIGS. 18A and 18B, a central hub 474 constructed in accordance with additional features will be described. The central hub 474 can have an intermediate elastomeric body 476 that defines a series of passages 480. The passages 480 can include oblong cross-sections on both ends. The passages 480 can taper inwardly from the ends to a central waist 486. The central waist 486 can have a circular cross-section. The profile of the passages 480 can provide incremental dampening of the coupling. The ends of the passages 480 can have a length 490 and a radius 492. The length 490 can be 9.6 mm. The radius 492 can be 3.5 mm.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A coupling assembly arranged between an input shaft and a rotor shaft of a supercharger, the coupling assembly comprising:
    a first hub mounted for concurrent rotation with the input shaft;
    a second hub mounted for concurrent rotation with the rotor shaft;
    a first side coupling assembly having a first side coupling body and a first side elastomeric insert, the first side coupling body including an outboard body portion and an inboard body portion, the outboard body portion including diametrically opposed inner and outer cylindrical walls that define a pocket that receives the first side elastomeric insert, the first side coupling assembly defining a first plurality of openings therein;
    a second side coupling assembly having a second side coupling body and a second side elastomeric insert, the second side coupling body including an outboard body portion and an inboard body portion, the outboard body portion including diametrically opposed inner and outer cylindrical walls that define a pocket that receives the second side elastomeric insert, the second side coupling assembly defining a second plurality of openings therein;
    a central hub disposed intermediate the first and second side coupling assemblies, the central hub defining central hub bores therein; and
    a plurality of coupler pins received in the central hub bores and extending on one end into the first plurality of openings and on a second end into the second plurality of openings;
    wherein the first and second side elastomeric inserts provide dampening between (i) the first side coupling body and the central hub and (ii) the second side coupling body and the central hub.

2. The coupling assembly of claim 1 wherein the first hub is configured to couple between the input shaft and the first side coupling assembly, the first hub having a first plurality of hub pins extending therefrom;
    and wherein the second hub is configured to couple between the rotor shaft and the second side coupling assembly, the second hub having a second plurality of hub pins extending therefrom.

3. The coupling assembly of claim 2 wherein the central hub further defines arcuate passages formed therein configured to at least partially receive the first hub pins and the second hub pins.

4. The coupling assembly of claim 3 wherein the plurality of openings of the first side coupling body have an oval shape and the first side elastomeric insert defines a plurality of openings having a circular shape.

5. The coupling assembly of claim 4 wherein the plurality of openings of the second side coupling body have an oval shape and the second side elastomeric insert defines a plurality of openings having a circular shape.

6. The coupling assembly of claim 5 wherein the plurality of coupler pins and the first plurality of hub pins are permitted to travel within the boundary of the oval openings in the first side coupling body while the first side elastomeric insert absorbs torsional loads.

7. The coupling assembly of claim 6 wherein the plurality of coupler pins and the second plurality of hub pins are permitted to travel within the boundary of the oval openings in the second side coupling body while the second side elastomeric insert absorbs torsional loads.

8. The coupling assembly of claim 7 wherein the first and second side elastomeric inserts are formed of molded rubber.

9. The coupling assembly of claim 2 wherein:
    the first side elastomeric insert provides parallel damping for the first side coupling assembly as it absorbs rotational energy from the coupler pins;
    the second side elastomeric insert provides parallel damping for the second side coupling assembly as it absorbs rotational energy from the coupler pins; and
    the first side coupling assembly and the second side coupling assembly cooperate to provide series dampening along the coupler pins along opposite sides of the central hub.

10. The coupling assembly of claim 1 wherein the first and second side coupling bodies are formed of glass-filled molded nylon.

11. A coupling assembly arranged between an input shaft and a rotor shaft of a supercharger, the coupling assembly comprising:
    a first hub mounted for concurrent rotation with the input shaft;
    a second hub mounted for concurrent rotation with the rotor shaft;
    a first side coupling assembly having a first side coupling body and a first side elastomeric insert, the first side coupling assembly defining at least a first opening therein;
    a second side coupling assembly having a second side coupling body and a second side elastomeric insert, the second side coupling assembly defining at least a second opening therein, wherein the first side coupling body and the second side coupling body both include (i) an outboard body portion having a cylindrical outer surface and (ii) an inboard body portion having a plurality of radially extending lobes;
    a central hub disposed intermediate the first and second side coupling assemblies;
    a first coupler pin extending on one end of the central hub into the first opening; and
    a second coupler pin extending on a second end of the central into the second opening;
    wherein the first and second side elastomeric inserts provide dampening between (i) the first side coupling body and the central hub and (ii) the second side coupling body and the central hub.

12. The coupling assembly of claim 11 wherein the first hub is configured to couple between the input shaft and the first side coupling assembly, the first hub having a first hub pin extending therefrom, wherein the second hub is configured to couple between the rotor shaft and the second side coupling assembly, the second hub having a second hub pin extending therefrom.

13. The coupling assembly of claim 12 wherein the central hub further defines arcuate passages formed therein configured to at least partially receive the first hub pin and the second hub pin.

14. The coupling assembly of claim 13 wherein the first side coupling body defines a plurality of openings having an oval shape and the first side elastomeric insert defines a plurality of openings having a circular shape.

15. The coupling assembly of claim 14 wherein the second side coupling body defines a plurality of openings having an oval shape and the second side elastomeric insert defines a plurality of openings having a circular shape.

16. The coupling assembly of claim 15 wherein the first coupler pin and first hub pin are permitted to travel within the boundary of the oval openings in the first side coupling body while the first side elastomeric insert absorbs torsional loads.

17. The coupling assembly of claim 16 wherein the second coupler pin and the second hub pin are permitted to travel within the boundary of the oval openings in the second side coupling body while the second side elastomeric insert absorbs torsional loads.

\* \* \* \* \*